United States Patent
Matsumoto et al.

(10) Patent No.: US 10,818,006 B2
(45) Date of Patent: Oct. 27, 2020

(54) COMMODITY MONITORING DEVICE, COMMODITY MONITORING SYSTEM, AND COMMODITY MONITORING METHOD

(71) Applicant: PANASONIC INTELLECTUAL PROPERTY MANAGEMENT CO., LTD., Osaka (JP)

(72) Inventors: Yuichi Matsumoto, Kanagawa (JP); Kazuma Yoshida, Saitama (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 200 days.

(21) Appl. No.: 16/080,345

(22) PCT Filed: Feb. 15, 2017

(86) PCT No.: PCT/JP2017/005483
§ 371 (c)(1),
(2) Date: Aug. 28, 2018

(87) PCT Pub. No.: WO2017/154488
PCT Pub. Date: Sep. 14, 2017

(65) Prior Publication Data
US 2019/0019285 A1    Jan. 17, 2019

(30) Foreign Application Priority Data
Mar. 11, 2016 (JP) .................. 2016-048496

(51) Int. Cl.
G06T 7/00      (2017.01)
G06Q 10/08    (2012.01)
G06T 11/60    (2006.01)

(52) U.S. Cl.
CPC ........... *G06T 7/0008* (2013.01); *G06Q 10/08* (2013.01); *G06Q 10/087* (2013.01);
(Continued)

(58) Field of Classification Search
CPC . G06T 7/0008; G06Q 10/0833; G06Q 10/087
See application file for complete search history.

(56) References Cited

U.S. PATENT DOCUMENTS

2017/0017840 A1* 1/2017 Higa .................. G06K 9/00201
2017/0061416 A1* 3/2017 Morate .................. G06F 16/51
(Continued)

FOREIGN PATENT DOCUMENTS

JP     05-081552      4/1993
JP     2013-152219    8/2013
(Continued)

OTHER PUBLICATIONS

Official Communication issued in International Pat. Appl. No. PCT/JP2017/005483, dated May 16, 2017.

*Primary Examiner* — Bobbak Safaipour
(74) *Attorney, Agent, or Firm* — Greenblum & Bernstein, P.L.C.

(57) ABSTRACT

A commodity monitoring device includes: an image acquisition unit (51) that sequentially acquires a sales floor image with the lapse of time; a shortage state detector (52) that detects a shortage state of commodities displayed on a sales floor based on the sales floor image, every time the image acquisition unit acquires the sales floor image; a duration acquisition unit (53) that acquires duration of the shortage state in a case where the shortage state of the commodities is detected by the shortage state detector; and a screen generator (54) that generates a state display image whose display form changes according to a length of the duration based on an output result of the duration acquisition unit to generate a monitoring screen including an image area in which the state display image is superimposed on the sales floor image.

11 Claims, 9 Drawing Sheets

(52) U.S. Cl.
CPC .......... *G06Q 10/0833* (2013.01); *G06T 11/60* (2013.01); *G06T 2207/10016* (2013.01); *G06T 2207/30232* (2013.01)

(56) References Cited

U.S. PATENT DOCUMENTS

| | | | |
|---|---|---|---|
| 2017/0300938 A1* | 10/2017 | Sakata | G06Q 50/10 |
| 2018/0189721 A1* | 7/2018 | Lee | G06Q 30/0223 |
| 2019/0236890 A1* | 8/2019 | Dubey | G07F 9/006 |
| 2020/0005231 A1* | 1/2020 | Nakagawa | H04W 4/35 |
| 2020/0021742 A1* | 1/2020 | Deng | G06K 9/00771 |
| 2020/0082369 A1* | 3/2020 | Smith | G07F 9/026 |

FOREIGN PATENT DOCUMENTS

| | | |
|---|---|---|
| JP | 2014-179740 | 9/2014 |
| JP | 2015-184997 | 10/2015 |
| JP | 5881022 | 2/2016 |

\* cited by examiner

COMMODITY MONITORING DEVICE, COMMODITY MONITORING SYSTEM, AND COMMODITY MONITORING METHOD

TECHNICAL FIELD

The present disclosure relates to a commodity monitoring device that monitors a shortage state of commodities displayed on a sales floor based on a sales floor image in which a moving object is removed from an image obtained by imaging the sales floor, a commodity monitoring system, and a commodity monitoring method.

BACKGROUND ART

In stores such as convenience stores, if commodities displayed on a sales floor are insufficient, sales opportunity loss occurs, and this sales opportunity loss greatly affects store sales. Therefore, in a case where there is a shortage of commodities, it is necessary to promptly execute commodity management work (replenishing work) to resolve the shortage state by replenishing the insufficient commodities.

As a related to such commodity management work, a commodity monitoring system that monitors the number of commodities based on the image obtained by imaging a display stand, specifies a zone on the image of the display stand, measures a base area of the display stand, determines the number of commodities in the zone based on the result, displays the analysis result of the image in the zone together with the image data of the display stand on a display based on the determination result, has been known (see PTL 1).

CITATION LIST

Patent Literature

PTL 1: Japanese Patent Unexamined Publication No. 5-81552

SUMMARY OF THE INVENTION

However, in the technique of the related art, it is possible to monitor a display status of commodities in a display area and instruct a store clerk for commodity management work as necessary, but in accordance with the instruction, the clerk does not necessarily promptly and appropriately carry out the commodity management work, and there is a problem that a user may not grasp the situation of the delay when the commodity management work is delayed.

Therefore, in the present disclosure, in a case where the commodity management work for resolving the shortage state of the commodities is delayed, there are provided a commodity monitoring device, a commodity monitoring system, and a commodity monitoring method, which are configured so that the user may easily grasp the situation of the delay.

The commodity monitoring device of the present disclosure is a commodity monitoring device that monitors a shortage state of commodities displayed on a sales floor based on a sales floor image in which a moving object is removed from an image obtained by imaging the sales floor, including a processor, and a memory which stores instructions, wherein the commodity monitoring device includes, as a configuration when the processor executes the instructions stored in the memory, acquires the sales floor image sequentially, detects the shortage state of commodities displayed on the sales floor based on the sales floor image, every time acquires the sales floor image, acquires duration of the shortage state in a case where the shortage state of the commodities is detected, and generates a state display image whose display form changes according to a length of the duration to generate a monitoring screen including an image area in which the state display image is superimposed on the sales floor image.

In addition, the commodity monitoring system of the present disclosure is a commodity monitoring system that monitors a shortage state of commodities displayed on a sales floor based on a sales floor image in which a moving object is removed from an image obtained by imaging the sales floor, including a camera that images the sales floor to output the sales floor image, a server device that generates and outputs a monitoring screen including the sales floor image, and a user terminal device that displays the monitoring screen, in which the server device acquires a sales floor image sequentially, detects a shortage state of commodities displayed on the sales floor based on the sales floor image every time acquires the sales floor image, acquires duration of a shortage state in a case where the shortage state of the commodities is detected, and generates a state display image whose display form changes according to a length of the duration to generate the monitoring screen including an image area in which the state display image is superimposed on the sales floor image.

In addition, the commodity monitoring method of the present disclosure is a method for causing an information processing device to perform processing of monitoring a shortage state of commodities displayed on a sales floor based on a sales floor image in which a moving object is removed from an image obtained by imaging the sales floor, including acquiring the sales floor image sequentially, detecting the shortage state of commodities displayed on the sales floor based on the sales floor image, every time the sales floor image is acquired, acquiring duration of the shortage state in a case where the shortage state of commodities is detected, and generating a state display image whose display form changes according to a length of the duration to generate a monitoring screen including an image area in which the state display image is superimposed on the sales floor image.

According to the present disclosure, since the display form of the state display image changes according to a length of the duration of the shortage state of commodities, when the commodity management work to resolve the shortage state of the commodities is delayed, the user may easily grasp the situation of the delay.

DESCRIPTION OF EMBODIMENTS

Figure 1:
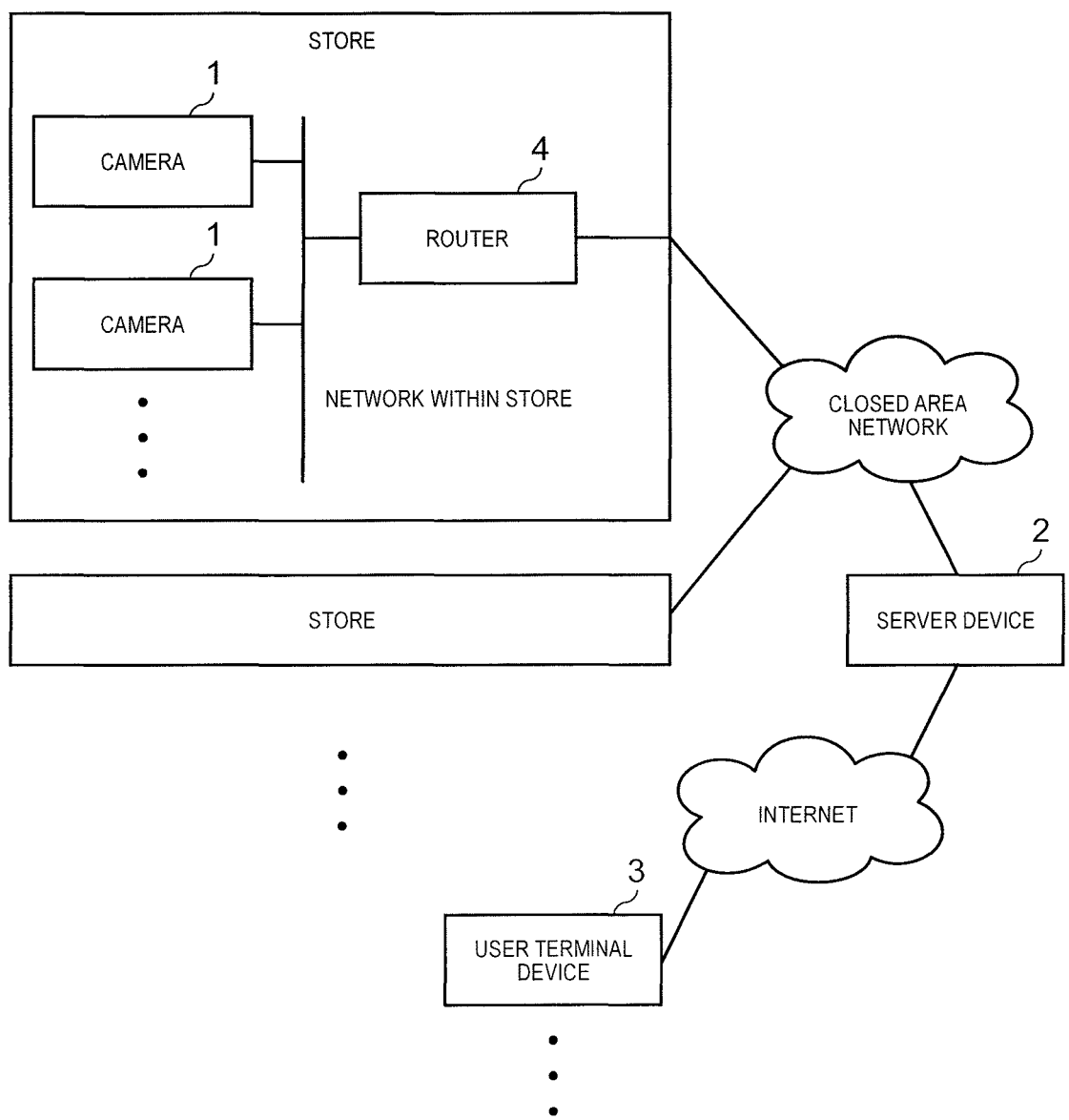
FIG. 1 is an overall configuration view of a commodity monitoring system according to a first embodiment.

According to a first disclosure made to solve the above problem, there is provided a commodity monitoring device that monitors a shortage state of commodities displayed on a sales floor based on a sales floor image in which a moving object is removed from an image obtained by imaging the sales floor, including a processor, and a memory which stores instructions, wherein the commodity monitoring device includes, as a configuration when the processor executes the instructions stored in the memory, acquires the sales floor image sequentially, detects the shortage state of commodities displayed on the sales floor based on the sales floor image every time acquires the sales floor image, acquires duration of the shortage state in a case where the shortage state of the commodities is detected, and generates a state display image whose display form changes according to a length of the duration to generate a monitoring screen including an image area in which the state display image is superimposed on the sales floor image.

In this manner, since the display form of the state display image changes according to the duration of the shortage state of commodities, when the commodity management work to resolve the shortage state of commodities is delayed, the user may easily grasp the situation of the delay.

In addition, in a second disclosure, the processor compares the sales floor images of previous time and current time to detect a shortage area which is a screen area in which a shortage state of commodities occurs in the sales floor image based on a difference between the two images.

In this manner, it is possible to easily obtain the position of the shortage area of commodities, that is, the position where a shortage state of commodities occurs.

In addition, in a third disclosure, the processor generates a shortage area image representing the shortage area as the state display image and superimposes the shortage area image on a corresponding position on the sales floor image.

In this manner, the user may easily grasp the position where a shortage state of commodities occurs.

In addition, a fourth disclosure, the processor sets a display element of at least one of color, transmittance, presence/absence of a frame line, and thickness of a frame line of the shortage area image to be changeable according to an operation input by the user.

In this manner, the user may appropriately select a display element of the shortage area image. In this case, the duration of the shortage state may be represented by the display element of the shortage area image.

In addition, in a fifth disclosure, the processor displays characters representing order of priority set according to the length of the duration in the vicinity of the shortage area image on the sales floor image.

In this manner, it is possible to easily grasp the order of priority when the user starts the commodity management work.

In addition, a sixth disclosure, the processor sets priority of the shortage area based on evaluation information on the sales floor and the commodities other than the length of the duration, in which the processor generates the shortage area image so as to represent the priority with a display element different from the display element representing the length of the duration.

In this manner, from various viewpoints, the user may grasp the priority of the commodity management work.

In addition, in a seventh disclosure, the processor sets the priority of the shortage area as the evaluation information based on at least one of information on a status of customers looking around on the sales floor, information on sales of the commodities, information on the stock of the commodities, information on delivery of the commodities, and information on priority per commodity classification.

In this manner, the user may perform commodity management work according to the priority considering the popularity of a commodity, sales, and the like.

In addition, in an eighth disclosure, the processor causes the state display image to be displayed in a first display form when the shortage state of commodities is first detected and changes the state display image to a second display form when the duration exceeds a predetermined reference time.

In this manner, since the duration of the shortage state of commodities is compared with the reference time and the display form of the state display image is changed in stages, the user may easily grasp the length of the duration, that is, the urgency of the commodity management work. In addition to changing the display form of the state display image in two stages, the display form of the state display image may be changed in three or more stages.

In addition, in a ninth disclosure, the processor acquires the sales floor image at predetermined unit time intervals, and counts the sales floor images in which the shortage state is consecutively detected and acquires the duration based on the number of the sales floor images in which the shortage state is consecutively detected.

In this manner, it is possible to easily obtain the duration of the shortage state of commodities.

In addition, a tenth disclosure is a commodity monitoring system that monitors a shortage state of commodities displayed on a sales floor based on a sales floor image in which a moving object is removed from an image obtained by imaging the sales floor, including a camera that images the sales floor to output the sales floor image, a server device that generates and outputs a monitoring screen including the sales floor image, and a user terminal device that displays the monitoring screen, in which the server device acquires the sales floor image sequentially detects the shortage state of commodities displayed on the sales floor based on the sales floor image, every time acquires the sales floor image, acquires duration of the shortage state in a case where the shortage state of the commodities is detected, and generates a state display image whose display form changes according to a length of the duration to generate the monitoring screen including an image area in which the state display image is superimposed on the sales floor image.

In this manner, as in the first disclosure, in a case where the commodity management work for resolving the shortage state of commodities is delayed, the user may easily grasp the situation of the delay.

In addition, an eleventh disclosure is a commodity monitoring method for causing an information processing device to perform processing of monitoring a shortage state of commodities displayed on a sales floor based on a sales floor image in which a moving object is removed from an image obtained by imaging the sales floor, including acquiring the sales floor image sequentially, detecting the shortage state of commodities displayed on the sales floor based on the sales floor image, every time the sales floor image is acquired, acquiring duration of the shortage state in a case where the shortage state of commodities is detected, and generating a state display image whose display form changes according to a length of the duration to generate a monitoring screen including an image area in which the state display image is superimposed on the sales floor image.

In this manner, as in the first disclosure, in a case where the commodity management work for resolving the shortage state of commodities is delayed, the user may easily grasp the situation of the delay.

Hereinafter, embodiments will be described with reference to drawings.

First Embodiment

FIG. 1 is an overall configuration view of a commodity monitoring system according to a first embodiment.

This commodity monitoring system is constructed for a retail chain store such as a convenience store, and the like, including camera 1 provided for each of a plurality of stores (facilities), server device (commodity monitoring device) 2, and user terminal device 3.

Camera 1 is set at a proper place in a store and images a sales floor in the store. This camera 1 is connected to server device 2 via a closed network such as a store internal network, router 4, and a virtual local area network (VLAN). In addition, in camera 1, image processing of removing a person from the image captured inside the store is performed, and a sales floor image (processed image) obtained by this image processing is output from camera 1.

Server device 2 receives sales floor images and the like transmitted from camera 1 installed in the store. In addition, server device 2 is connected to user terminal device 3 via the Internet, generates a monitoring screen to be viewed by a user to distribute the screen to user terminal device 3, and acquires information input by the user on the monitoring screen.

User terminal device 3 is constituted with a smartphone, a tablet terminal, and a PC. In this user terminal device 3, a monitoring screen distributed from server device 2 is displayed. When this monitoring screen is viewed by the user, it is possible to grasp the situation in the store.

Figure 2:
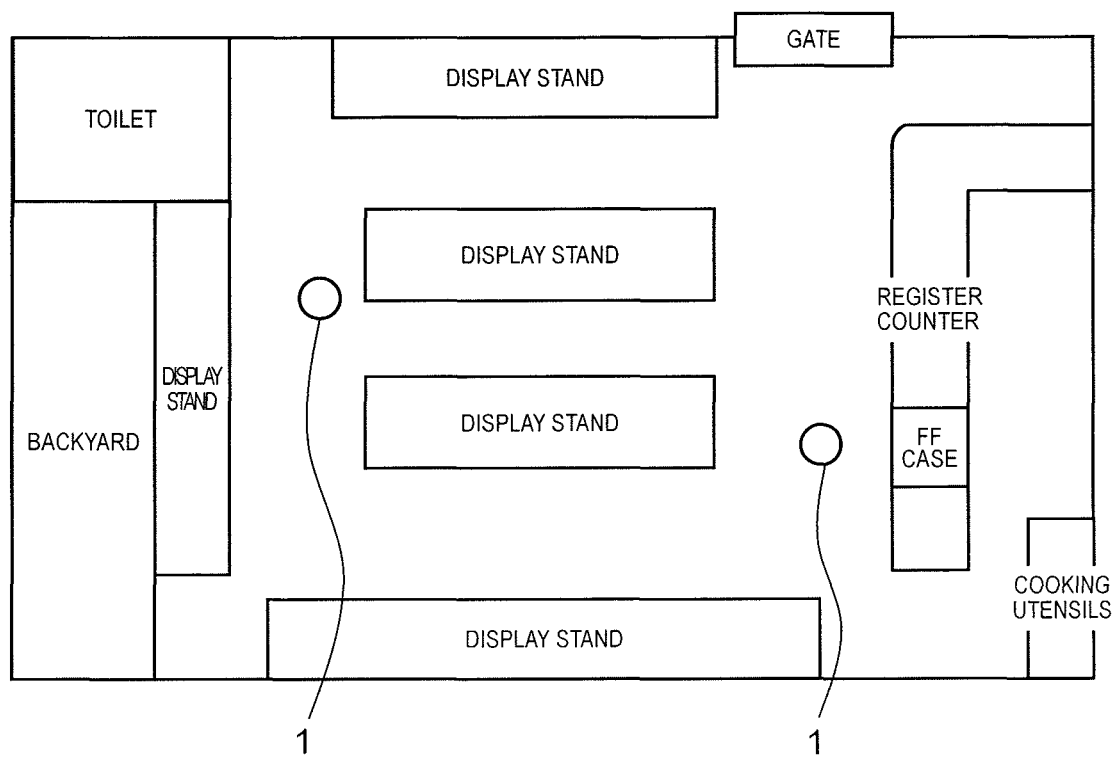
FIG. 2 is a plan view of a store for describing a layout of the store and an installation state of camera 1.

Next, the layout of the store and the installation condition of camera 1 will be described. FIG. 2 is a plan view of a store for describing a layout of the store and an installation state of camera 1.

The store has entrances, display shelves, cash register, cooking utensils, and the like. The display shelves are divided into commodity categories (kinds) such as fast food (FF), rice (commodity such as rice balls, box lunches, and sushi), bakery, dessert, drinks, processed food, miscellaneous goods, fresh food, magazines, newspapers to be installed. The cooking utensils are used to cook fast food such as fried nuggets in the store, and a fast food display shelf (FF case) is installed next to a register counter. When a customer enters from an entrance, moves through the aisle between the display shelves to go through the store, and finds a desired commodity, the customer goes to the register counter with the commodity and leaves a gate after completing accounting (payment of the commodity) with the register counter.

In addition, in the store, a plurality of cameras 1 for imaging the sales floor are installed. Camera 1 is installed at an appropriate position on the ceiling in the store. In particular, in the example shown in FIG. 2, an omnidirectional camera having an imaging range of 360 degrees by using a fish-eye lens is adopted for camera 1, and by this camera 1, it is possible to image commodities and the like displayed on the display shelves of the sales floor or the like.

Figure 3:
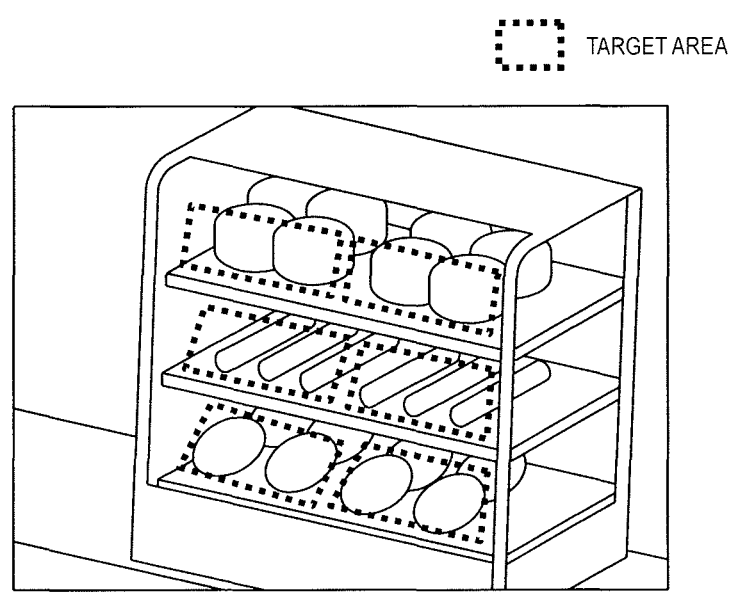
FIG. 3 is an explanatory view showing a target area set on a sales floor image.
Figure 4:
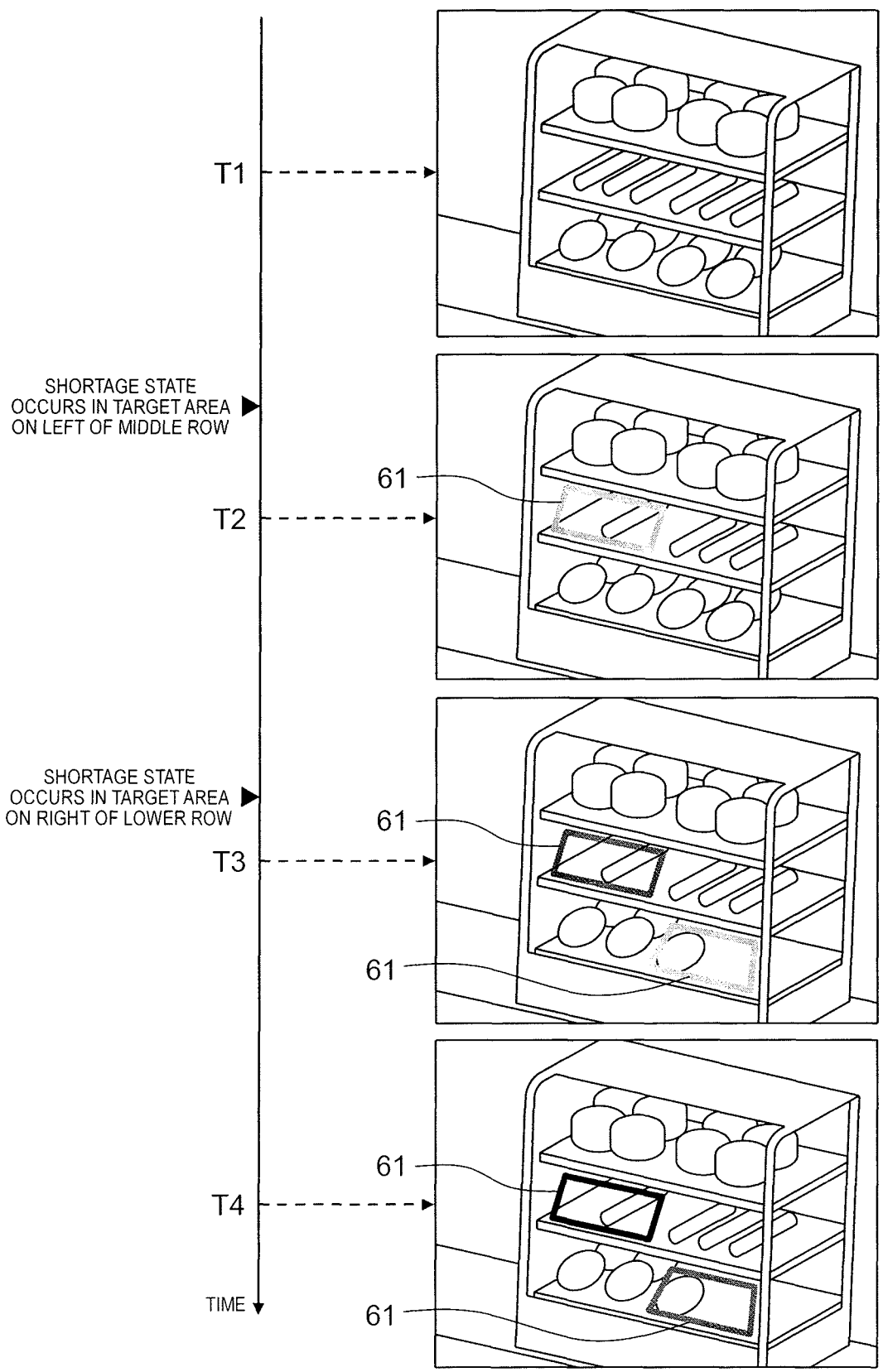
FIG. 4 is an explanatory view showing a transition state of a monitoring image displaying a shortage state of commodities.
Figure 5:
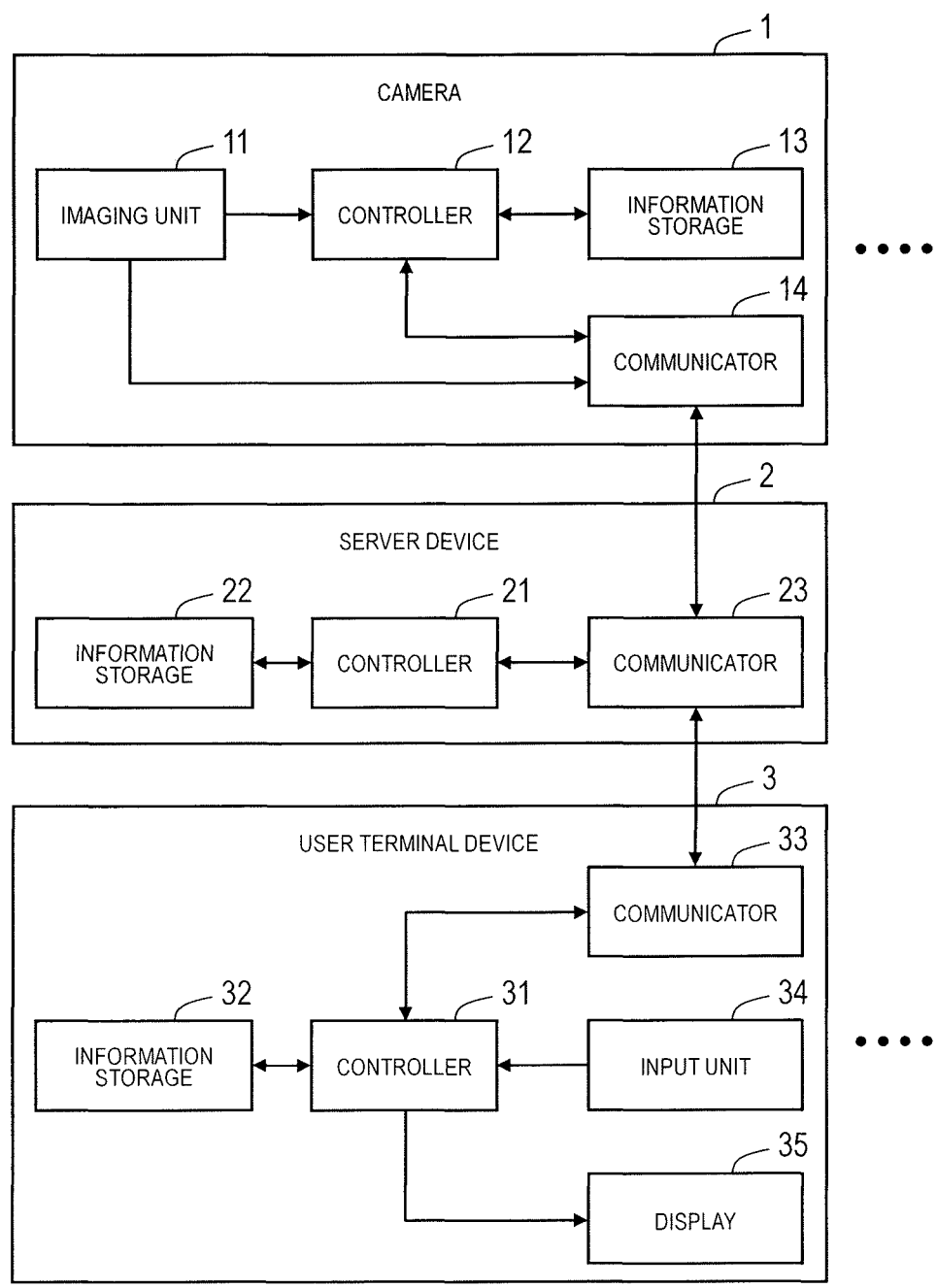
FIG. 5 is a block view showing a hardware configuration of camera 1, server device 2, and user terminal device 3.

Next, an overview of the processing performed by server device 2 will be described. FIG. 3 is an explanatory view showing a target area set on a sales floor image. FIG. 4 is an explanatory view showing a transition state of a monitoring image displaying a shortage state of commodities.

In the present embodiment, as shown in FIG. 3, the user sets a target area in the area in which the commodities in the sales floor image are placed to detect a shortage state of the commodities for each target area. Then, as shown in FIG. 4, shortage area image (state display image) 61 representing the target area in which the shortage state is detected is displayed superimposed on the sales floor image. In the example shown in FIG. 4, shortage area image 61 is composed of a frame line representing the outline of the target area.

The examples shown in FIGS. 3 and 4 are fast food sales floors and the sales floor images show fast food display shelves (FF case). In the example shown in FIG. 3, a total of six target areas, that is, the left and right of the upper row, the right and left of the middle row, and the left and right of the lower row in the fast food display shelf are set.

In addition, in the present embodiment, by measuring the duration of the shortage state of commodities, that is, the elapsed time from the detection of the shortage state to the present, shortage area image 61 is displayed so that the display form changes according to the length of the duration, that is, the emergency of the replenishing operation, as shown in FIG. 4. In particular, in the present embodiment, the display color of shortage area image 61 is changed according to the duration of the shortage state. Specifically, as the duration of the shortage state becomes longer, the display color of shortage area image 61 is changed in the order of blue, green, and red.

In the example shown in FIG. 4, shortage area image 61 is not displayed at time T1, since a shortage state of commodities is not detected in all target areas. Next, at time T2, since a shortage state occurs in the target area on the left in the middle row, shortage area image 61 of the target area is displayed in blue. Next, at time T3, since the shortage state has not been resolved in the target area on the left in the middle row, the display color of shortage area image 61 of the target area changes to green. In addition, since a shortage state occurs in the target area on the right in the lower row, shortage area image 61 of the target area is displayed in blue. Next, at time T4, since the shortage state has not been resolved in the target area on the left in the middle row, the display color of shortage area image 61 of the target area changes to red. In addition, since the shortage state has not been resolved in the target area on the right in the lower row, the display color of shortage area image 61 of the target area changes to green.

Thus, in the present embodiment, since the display color (display form) of shortage area image 61 changes according to the length of the duration of the shortage state of commodities, that is, the urgency of the replenishing work, the user intuitively grasps the priority of the start of replenishing work. In particular, even in a case where a shortage state occurs in a plurality of target areas, since the display color of shortage area image 61 is different according to the length of the duration time, the user may easily grasp where to prioritize the replenishing operation.

Next, a schematic configuration of camera 1, server device 2 and user terminal device 3 will be described. FIG.

5 is a block view showing a hardware configuration of camera 1, server device 2, and user terminal device 3.

Camera 1 includes imaging unit 11, controller 12, information storage 13, and communicator 14.

Imaging unit 11 includes an image sensor and sequentially outputs the captured images (frames) that are temporally consecutive, so-called moving images. The controller 12 performs image processing for removing a moving object such as a person from the captured image and outputs the moving object removed image generated by the image processing as a sales floor image. Information storage 13 stores a program to be executed by a processor constituting controller 12 and a captured image output from imaging unit 11. Communicator 14 communicates with server device 2 and transmits the sales floor image output from controller 12 to server device 2 via the network.

Server device 2 includes controller 21, information storage 22, and communicator 23.

Communicator 23 communicates with camera 1 and user terminal device 3, receives the sales floor image transmitted from camera 1, receives the user setting information transmitted from user terminal device 3, and distributes the monitoring screen to be viewed by the user to user terminal device 3. In information storage 22, sales floor images for each camera 1 received by communicator 23, programs executed by the processor constituting controller 21, and the like are stored. Controller 21 generates a monitoring screen to be distributed to user terminal device 3.

User terminal device 3 includes controller 31, information storage 32, communicator 33, input unit 34, and display 35.

Input unit 34 inputs various setting information by the user. Display 35 displays the monitoring screen based on the screen information transmitted from server device 2. Input unit 34 and display 35 may be constituted with a touch panel display. Communicator 33 communicates with server device 2, transmits the user setting information input by input unit 34 to server device 2, and receives screen information transmitted from server device 2. Controller 31 controls each unit of user terminal device 3. Information storage 32 stores programs executed by the processors constituting controller 31 and the like.

Figure 6:
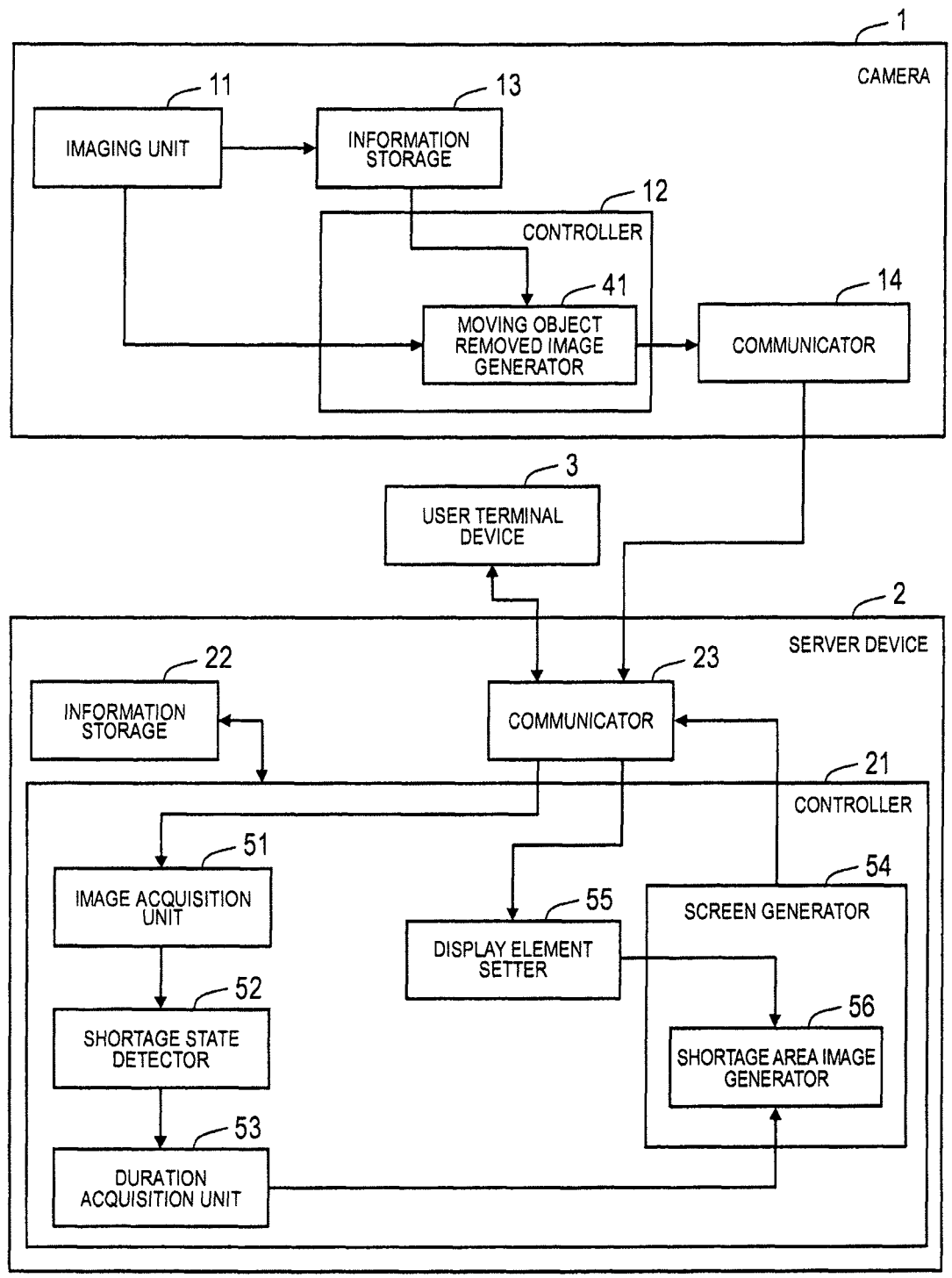
FIG. 6 is a functional block view of camera 1 and server device 2.

Next, the functional configuration of camera 1 and server device 2 will be described. FIG. 6 is a functional block view of camera 1 and server device 2.

Controller 12 of camera 1 includes moving object removed image generator 41. Moving object removed image generator 41 is realized by causing the processor constituting controller 12 to execute a monitoring program (instruction) stored in information storage 13.

In the moving object removed image generator 41, a moving object removed image is generated by removing a moving object from the captured image based on a plurality of captured images (frames) in a predetermined learning period. Specifically, when temporally consecutive captured images output from imaging unit 11 are sequentially input to moving object removed image generator 41, dominant image information in pixel units (color information in a dominant state) is obtained to generate a moving object removed image (background image) based on a plurality of captured images in the most recent predetermined sampling period. Then, the latest moving object removed image may be obtained by updating such dominant image information each time a captured image is input. For generation of this moving object removed image, a known background image generation technique may be used.

In this manner, the moving object removed image generated by moving object removed image generator 41 is transmitted as a sales floor image from communicator 14 to server device 2 at predetermined unit time intervals (for example, at intervals of 15 minutes). Specifically, in server device 2, an image transmission request to camera 1 is periodically performed at a predetermined timing (for example, at intervals of 15 minutes), and in communicator 14 of camera 1, in response to the image transmission request from server device 2, the sales floor image at that time is transmitted.

Controller 21 of server device 2 includes image acquisition unit 51, shortage state detector 52, duration acquisition unit 53, screen generator 54, and display element setter 55. Each unit of controller 21 is realized by causing the processor constituting controller 21 to execute the monitoring program (instruction) stored in information storage 22.

In image acquisition unit 51, a sales floor image periodically transmitted from camera 1 and received by communicator 23 is acquired. The sales floor image obtained by this image acquisition unit 51 is stored in information storage 22.

Shortage state detector 52 detects a shortage state of the commodities displayed on the sales floor based on the sales floor image acquired by image acquisition unit 51. This processing is performed each time a sales floor image is acquired by image acquisition unit 51. In addition, shortage state detector 52 compares the previous sales floor image stored in information storage 22 with the current sales floor image acquired by image acquisition unit 51 to detect a shortage area that is an image area in which a shortage state occurs in the sales floor image based on the difference between the two images. Here, in the present embodiment, since a shortage state of commodities in the target area set by the user is detected, an image of the target area is extracted from the sales floor image and the shortage state of the target area is detected based on the image of the target area.

The sales floor image is an image processed to remove a moving object such as people, and since moving objects covering the commodities are removed, it is possible to detect the situation of the commodities accurately.

In a case where a shortage state of commodities is detected by shortage state detector 52, duration acquisition unit 53 acquires the duration of the shortage state, that is, the elapsed time from the detection of the shortage state to the present. In the present embodiment, shortage state detector 52 counts the number of sales floor images in which a shortage state is consecutively detected for the same sales floor, and based on the number of sales floor images in which a shortage state is detected consecutively, a duration is obtained.

Here, in the present embodiment, sales floor images are transmitted from camera 1 at predetermined unit time intervals (for example, at intervals of 15 minutes). That is, image acquisition unit 51 of server device 2 periodically acquires a sales floor image at predetermined unit time intervals. Therefore, the time calculated by multiplying the predetermined unit time interval by the number of sales floor images in which the shortage state is continuously detected represents the duration of the shortage state of the commodities.

A timer may be provided to measure the elapsed time from the detection of the shortage state of commodities to the present time so that the duration of the shortage state of commodities may be measured.

Screen generator 54 includes shortage area image generator 56. In this shortage area image generator 56, shortage area image (state display image) 61 (see FIG. 4) whose display form changes according to the duration of the shortage state of commodities is generated based on the output result of duration acquisition unit 53. Then, screen generator 54 generates a monitoring screen including an image area in which shortage area image 61 acquired by shortage area image generator 56 is superimposed on the sales floor image.

In display element setter 55, the display element of shortage area image 61 is set according to the user's operation input performed by user terminal device 3. In the present embodiment, it is possible to change at least one of the color, the transmittance, the presence/absence of the frame line, and the thickness of the frame line of shortage area image 61. The display element of shortage area image 61 represents the duration of the shortage state, and the user may freely customize how to represent the duration of the shortage state in shortage area image 61.

Figure 7:
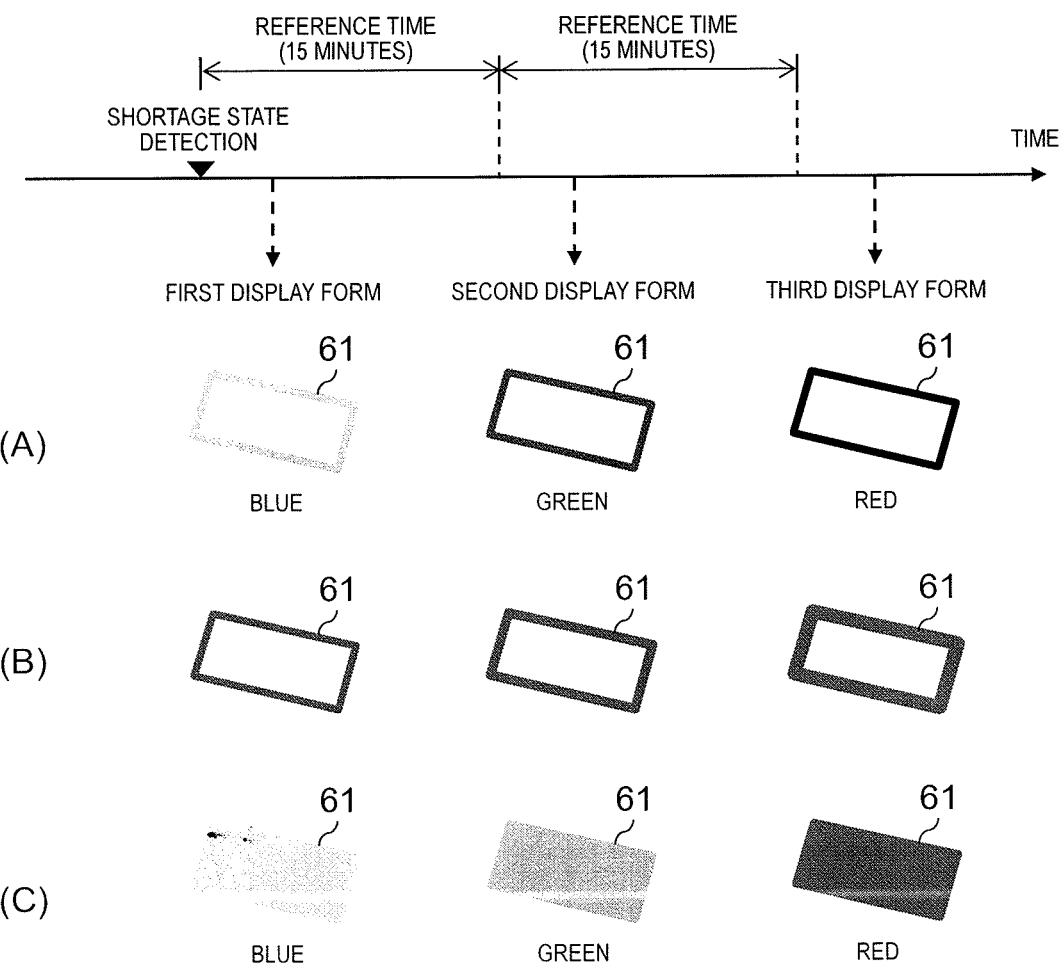
FIG. 7(A) 7(C) are explanatory views showing situations in which a display form of shortage area image 61 changes according to a length of duration.

Next, shortage area image 61 generated by shortage area image generator 56 will be described. FIG. 7 is an explanatory view showing a situation in which a display form of shortage area image 61 changes according to a length of duration.

In the present embodiment, shortage area image generator 56 generates shortage area image 61 whose display form changes according to the duration of the shortage state. At this time, the duration is compared with the predetermined reference time, and shortage area image 61 is sequentially changed to different display forms as the duration exceeds the reference time.

That is, when a shortage state of commodities is not detected, shortage area image 61 is not displayed, and when a shortage state of commodities is detected for the first time, shortage area image 61 is displayed in the first display form (initial display form). Then, when the duration exceeds the predetermined reference time, that is, when the reference time elapses after detecting a shortage state of commodities for the first time, the second display form different from the first display form is changed for shortage area image 61. Further, when the duration exceeds the second reference time, shortage area image 61 is changed to a third display form.

For example, when the reference time is set to be 15 minutes, shortage area image 61 is displayed in the first display form in the period from 0 minutes to less than 15 minutes, in the period from 15 minutes to less than 30 minutes, shortage area image 61 is displayed in the second display form, and in the period of 30 minutes or more, shortage area image 61 is displayed in the third display form.

In addition, in the present embodiment, in display element setter 55, according to the operation input by the user, it is possible to set at least one display element of the color, the transmittance, the presence/absence of the frame line, and the thickness of the frame line of the shortage area image 61 to be changeable. In the present embodiment, a rectangular image is used as shortage area image 61, but a predetermined icon may be disposed at the center position of the target area set by the user, and the display form thereof may be displayed so as to be changeable.

In the example shown in (A) of FIG. 7, as in the example shown in FIG. 4, shortage area image 61 is composed of a frame line representing the outline of the target area, and the display element representing the length of the duration is set as the color of the frame line, and as the duration becomes longer, the color of the frame line changes in the order of blue, green, and red.

The color of frame line is not limited to blue, green, and red. In addition, the frame line may be superimposed on the sales floor image with a single color in a transparent state and the length of the duration may be represented by the transmittance of frame line.

In the example shown in (B) of FIG. 7, as in the example shown in (A) of FIG. 7, shortage area image 61 is composed of a frame line representing the outline of the target area, but here, the display element representing the length of the duration is the thickness of the frame line, and the frame line becomes thicker as the duration becomes longer.

In addition to the thickness of the frame line, the length of the duration may be represented by the line type of the frame line (for example, a solid line or a dotted line).

In the example shown in (C) of FIG. 7, shortage area image 61 is composed of an image in which the inside of the outline of the target area is painted, a display element representing the length of the duration is set as a fill color, and as the duration becomes longer, the fill color changes in the order of blue, green, and red.

The fill color is not limited to blue, green, and red. In addition, the filled image may be superimposed on the sales floor image with a single color in the transparent state and the length of the duration may be represented by the transmittance of the filled image.

In the present embodiment, the display form of shortage area image 61 is changed in three stages, but may be changed in two stages or four stages or more.

In addition, in the present embodiment, the display form of the shortage area image 61 is changed stage by stage based on a single unit time, but the display form of shortage area image 61 (for example, the hue and density of the display color) may be changed in a stageless manner according to the length of the duration without determining the unit time. In addition, the unit time may be changed according to the stage, that is, the first reference time and the second reference time may be set to different lengths.

Figure 8:
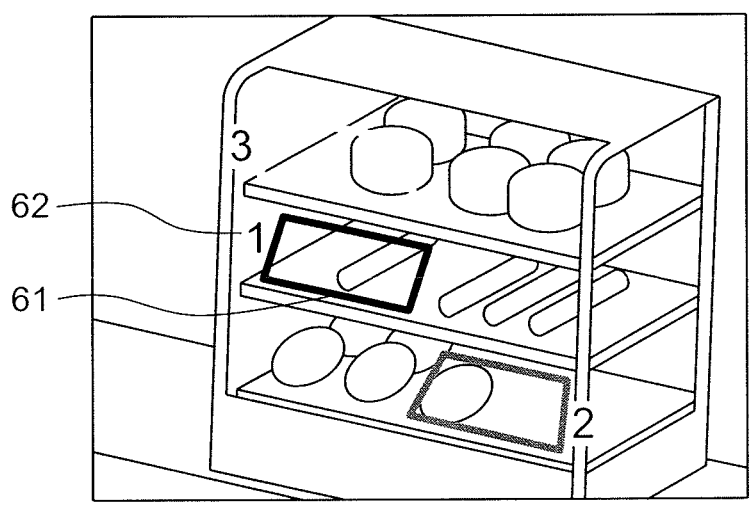
FIG. 8 is an explanatory view showing another example of a state display image showing the length of the duration.

Next, another example of the state display image showing the length of the duration will be described. FIG. 8 is an explanatory view showing another example of the state display image.

In another example, the state display image representing the length of the duration is composed of shortage area image 61 corresponding to the target area and character image 62 representing the order of priority set according to the length of the duration. That is, character image 62 representing the order of priority is displayed near shortage area image 61 on the sales floor image. Thereby, when a shortage state occurs in a plurality of target areas, the user may easily grasp the order of priority of starting replenishing work.

In this case, if a shortage state is detected in a plurality of target areas in shortage state detector 52 of server device 2, controller 21 compares durations for each target area acquired by duration acquisition unit 53 and assigns order of priority to each target area.

In the example shown in FIG. 8, a case where a shortage state occurs in a plurality of target areas in one sales floor image is shown, but if a plurality of sales floor images are displayed on the monitoring screen, a shortage state may occur in a plurality of target areas as the whole monitoring screen, and even in such a case, it is possible to determine the priority of work between different sales floors by displaying the characters representing the order of priority.

Second Embodiment

Figure 9:
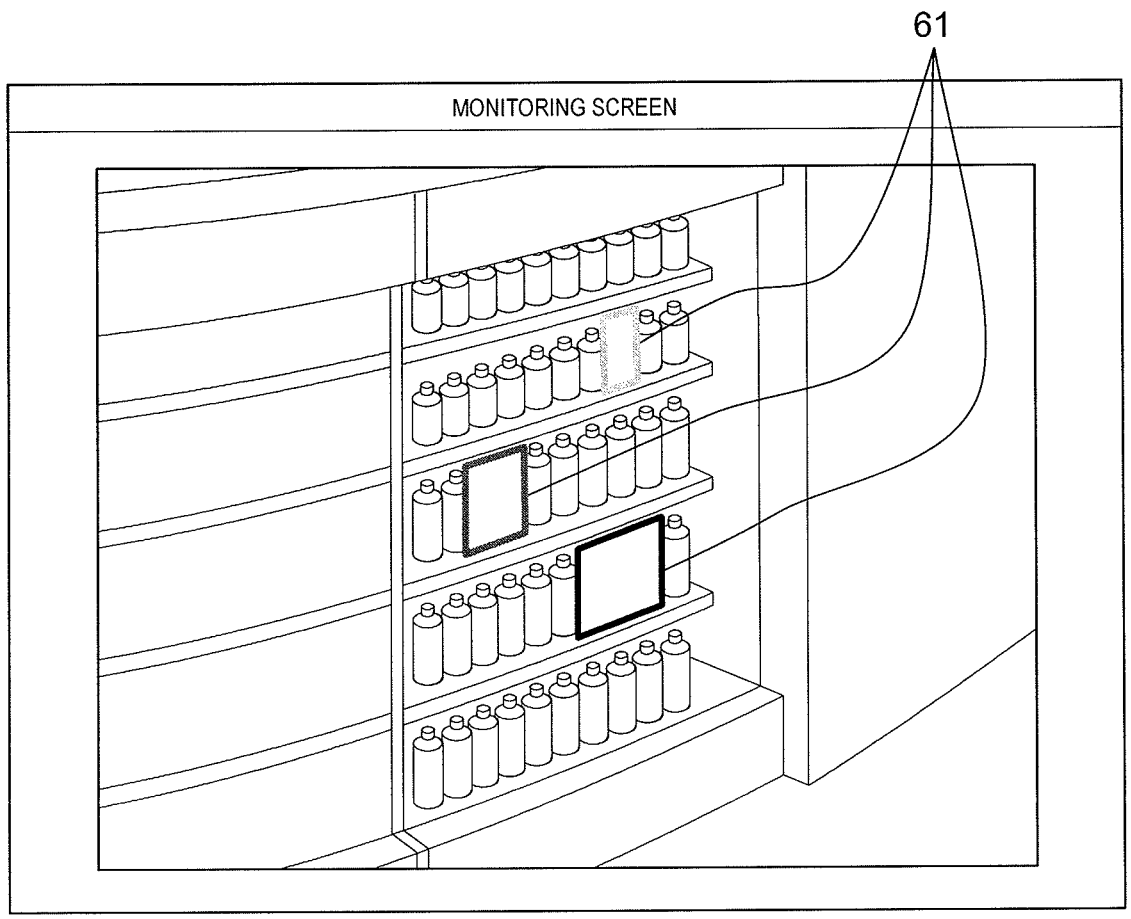
FIG. 9 is an explanatory view showing a monitoring screen according to a second embodiment.

Next, a second embodiment will be described. The points not mentioned in particular here are the same as those in the above embodiment. FIG. 9 is an explanatory view showing a monitoring screen according to the second embodiment.

In the first embodiment, a target area is set in a range in which a plurality of commodities exist on a sales floor image, and a shortage state of commodities in the target area is detected, but in this second embodiment, a target area is not set and the entire sales floor image is set as a detection target of the shortage state, and a stockout of each commodity is detected as a shortage state. Specifically, an image area in which a stockout occurred in a sales floor image is detected as a shortage area, and shortage area image 61 is displayed at the position of the shortage area.

In the present embodiment, shortage state detector 52 of server device 2 compares the previous sales floor image stored in information storage 22 with the current sales floor image acquired by image acquisition unit 51 to detect an image area in which a stockout occurs in the sales floor image as a shortage area based on the difference between the two images. In addition, a sales floor image captured in a state where there is no stockout of commodities may be compared with the current sales floor image to detect a shortage area.

As in the first embodiment, the display color (display form) of shortage area image 61 is changed according to the duration of the shortage state, specifically, as the duration of the shortage state becomes longer, the display color of shortage area image 61 is changed in the order of blue, green, and red.

In addition, in the present embodiment, when a plurality of adjacent commodities are out of stock, shortage area image 61 is displayed so as to cover the entire image area in which the commodities out of stock are located, and shortage area image 61 is enlarged as the number of commodities out of stock increases. Therefore, depending on the size of shortage area image 61, the user may grasp the quantity of the commodities out of stock. Thereby, the user may determine the priority of replenishing work in consideration of the quantity of the commodities out of stock in addition to the duration of the shortage state.

In the present embodiment, shortage area image 61 is targeted for a plurality of commodities out of stock, but the timing at which the stockout of each commodity occurs is different for each commodity. Therefore, for each commodity, a duration of shortage, that is, an elapsed time from the detection of a stockout to the present time is measured, and among the commodities to be target of shortage area image 61, the commodity with the longest shortage duration, that is, the shortage duration of the commodity becoming out of stock first is set as the duration of the shortage state of the whole shortage area, and shortage area image 61 is displayed with a display color (display form) corresponding to the duration of this shortage state.

Third Embodiment

Figure 10:
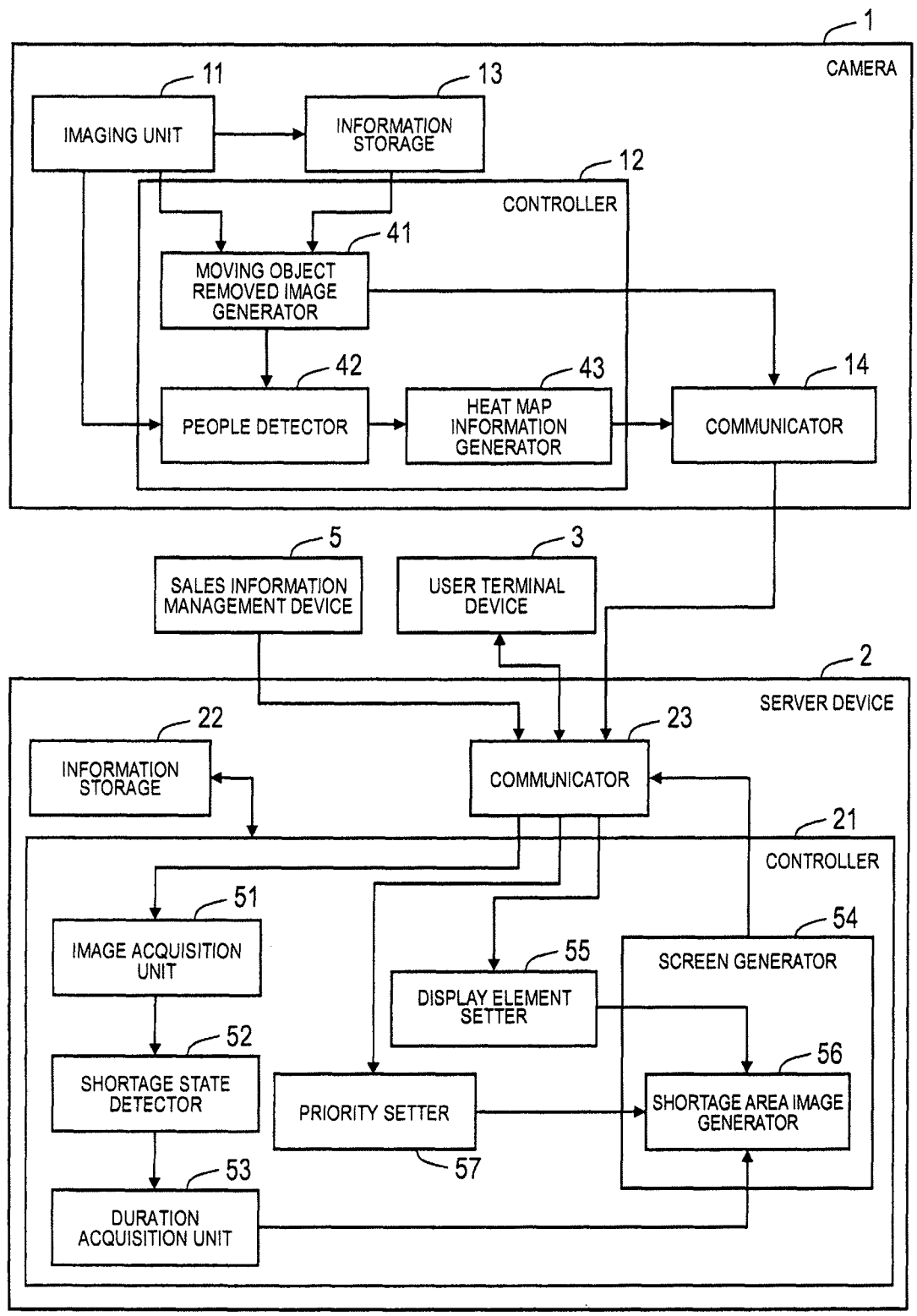
FIG. 10 is a functional block view of camera 1 and server device 2 according to a third embodiment.

Next, a third embodiment will be described. The points not mentioned in particular here are the same as those in the above embodiment. FIG. 10 is a functional block view of camera 1 and server device 2 according to a third embodiment.

In the first embodiment, the display form of shortage area image 61 is changed according to the duration of the shortage state of the commodities, but in the third embodiment, in addition to the duration, the display form of shortage area image 61 is changed according to the priority set based on heat map information. The heat map information relates to the number of people looking around in front of the sales floor (number of people looking around), and because of a large number of people looking around, it is possible to determine the degree of popularity of the commodities displayed on the sales floor. This heat map information is generated by camera 1 and transmitted to server device 2.

The camera includes people detector 42 and heat map information generator 43.

In people detector 42, the moving object removed image (background image) acquired by moving object removed image generator 41 is compared with the current captured image output from imaging unit 11, and the image area of the moving object in the captured image is specified from the difference between the two images (moving object detection). When a Ω shape constituted with the face, or the head and the shoulder portion of a person is detected in the image area of the moving object, the moving object is determined as a person (people detection). Known techniques may be used for this moving object detection and people detection.

Heat map information generator 43 generates heat map information representing the distribution situation of the people on the captured image based on the detection result of people detector 42. In this heat map information, a people existing in each cell (grid) obtained by dividing a captured image into a lattice shape is counted in a predetermined measurement period (for example, one hour) and a distribution state of people is presented based on the count value (number of people) of each cell. From the count value in the area in which people are looking around in front of the sales floor in the captured image, it is possible to acquire the number of people looking around in front of the sales floor (the number of people looking around for each sales floor).

The heat map information acquired by heat map information generator 43 is transmitted from communicator 14 to server device 2 together with the sales floor image (moving object removed image) acquired by moving object removed image generator 41.

As the heat map information, the time (time of looking around) during which people are looking around in front of the sales floor may be acquired, and if the time of looking around is long, it is possible to determine the popularity of the commodities displayed on the sales floor.

Server device 2 includes priority setter 57.

In this priority setter 57, priority (urgency of replenishing) of a shortage area at the time of starting replenishing work is set based on the heat map information acquired from camera 1. The sales floor in which a lot of people are looking around displays commodities that are highly popular with customers, and it is necessary to promptly replenish the commodities. Therefore, the priority (urgency of replenishing) of the shortage area in the sales floor where the number of people stayed is large is set high. At this time, the latest heat map information collected in the latest time zone may be used, but heat map information collected in the same time zone in the past (for example, yesterday) may be used.

In addition, priority setter 57 sets the priority of the shortage area based on the sale information (sales information) acquired from sales information management device 5. Sales information management device 5 constitutes a point of sale (POS) system (sale information management system) that manages sale information (sales information) on sales of each commodity in the store and provides the sale information to server device 2.

Here, the more sales, the more popular the commodity, the more quickly the commodity needs to be replenished. Therefore, in the present embodiment, the priority (urgency of replenishing) of the shortage area of the commodity with high sales is set high. At this time, the latest sales information collected in the latest time zone may be used, but sales information collected in the same time zone in the past (for example, yesterday) may be used.

In addition, priority setter 57 sets the priority of the shortage area based on the stock information acquired from sales information management device 5. Sales information management device 5 also has a function of managing the stock of the store and provides stock information to server device 2. Here, in the commodities out of stock, even if the priority (urgency of replenishing) is set high, replenishing work may not be started. Therefore, in the present embodiment, the priority of the shortage area of the commodity with stock is set high.

In addition, priority setter 57 sets the priority of the shortage area based on the delivery information held in information storage 22. For the commodity such as a box lunch, the time to deliver the commodity to the store is determined, and the delivery information on the delivery schedule of this commodity is held in advance in information storage 22. Here, in the case of the commodity having a short elapsed time from the delivery time, it is considered that the stock thereof is sufficient. Therefore, in the present embodiment, the priority of the shortage area of the commodity having a short elapsed time from the delivery time is set high. Even for a commodity such as a lunch box with scheduled delivery, if there are only commodities that are displayed and there is time until the next delivery time, it is not possible to perform commodity replenishing work, but in place of the replenishing work, commodity management work to resolve the commodities that are likely to be unsold, such as face up work, may be carried out.

In addition, in priority setter 57, the priority of the shortage area is set based on the priority determined in advance for each classification of commodities (fast food, box lunch, and the like). That is, when the commodity class has a high priority, the priority of the shortage area is set high. As described above, even if the heat map information and the sales information are not used, the user may grasp the commodity classification which is highly popular and good in the sale to some extent. Then, in the present embodiment, the user presets the priority for each commodity classification and causes information storage 22 to hold information on the priority for each commodity classification to set the priority of the shortage area based on the information on the priority for each commodity classification.

As described above, in the present embodiment, priority setter 57 of server device 2 sets the priority of the shortage area based on evaluation information on the sales floor and commodities other than length of the duration, that is, information on the state of customers looking around on the sales floor (heat map information), information on sales of commodities, information on stock of commodities, information on delivery of commodities, and information on the priority for each commodity classification. The priority of the shortage area may be set by using only one of these pieces of evaluation information, but all or a part of these pieces of evaluation information may be combined to set the priority of the shortage area.

Figure 11:
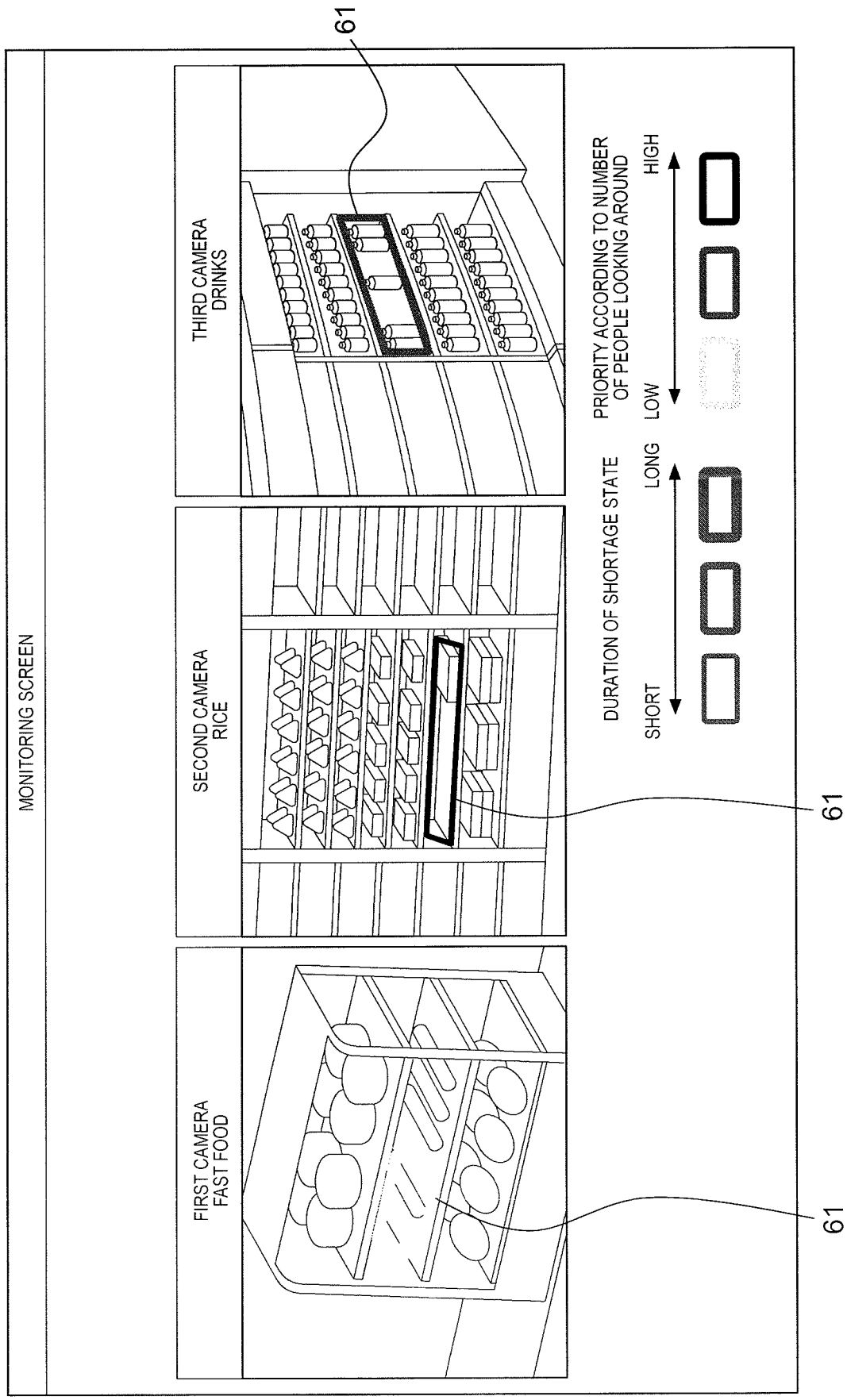
FIG. 11 is an explanatory view showing a monitoring screen according to the third embodiment.

Next, a monitoring screen according to the third embodiment will be described. FIG. 11 is an explanatory view showing a monitoring screen according to the third embodiment.

On this monitoring screen, sales floor images captured by a plurality of cameras 1 are displayed side by side. First camera 1 images the sales floor of the fast food, second camera 1 images the sales floor of rice (rice balls, lunch boxes, sushi, and the like), and third camera 1 images the sales floor of drinks.

In addition, as described above, in the present embodiment, in priority setter 57, the priority of the shortage area is set based on the evaluation information on the sales floor and commodities other than the duration of the shortage state of commodities. In shortage area image generator 56, shortage area image 61 is generated so that the priority is represented by a display element different from the display element representing the length of the duration.

In the example shown in FIG. 11, the length of the duration of the shortage state of commodities is represented by the thickness of the frame line of shortage area image 61, evaluation information other than the length of the duration, for example, the severity of priority based on the heat map information (the number of people looking around and the like) is represented by the color of the frame line of shortage area image 61 (for example, blue, green, and red).

The priority may be represented by other display elements such as transparency of shortage area image 61.

Thus, in the present embodiment, since the priority set based on the evaluation information other than the duration of the shortage state of commodities is represented by shortage area image 61, from the viewpoint different from the length of the duration of the shortage state, it is possible to start replenishing work by taking the urgency of replenishing work into account. For example, in the area where the duration of the shortage state is long, but customers do not visit so much, the user may make a decision to postpone the replenishing work of the area.

In the present embodiment, the priority based on the evaluation information other than the length of the duration of the shortage state of commodities is represented by the shortage area image 61 along with the duration of the shortage state, but the shortage area image 61 may represent only the duration and the priority based on the evaluation information other than the length of the duration of the shortage state may be displayed as characters or an image separately from shortage area image 61. In addition, an image representing the evaluation information serving as a source of the priority, for example, a heat map image representing heat map information may be displayed separately from shortage area image 61.

As described above, the embodiment has been described as an example of the technique disclosed in the present application. However, the technique in the present disclosure is not limited thereto and may also be applied to embodiments in which change, replacement, addition, omission, and the like are performed. In addition, it is also possible to combine the constituent elements described in the above embodiments into a new embodiment.

For example, in the above embodiment, an example of a retail store such as a convenience store has been described, but is not limited to such a retail store and may also be applied to a store of a business type other than a retail store.

In addition, in the above embodiment, as shown in FIG. 2, the camera 1 is an omnidirectional camera having an imaging range of 360 degrees using a fisheye lens, but it is also possible to use a camera having a predetermined angle of view, a so-called box camera.

In addition, in the above embodiment, each processing of shortage state detection, duration acquisition, and screen generation is performed in server device 2, but all or a part of these kinds of processing may be performed by a PC installed in the store.

INDUSTRIAL APPLICABILITY

The commodity monitoring device, the commodity monitoring system, and the commodity monitoring method according to the present disclosure have an effect of easily grasping the situation of a delay when commodity management work for resolving a shortage state of commodities is delayed, and are useful as a commodity monitoring device, a commodity monitoring system and a commodity monitoring method for monitoring a shortage state of the commodities displayed on a sales floor based on a sales floor image from which a moving object is removed in an image of the sales floor.

REFERENCE MARKS IN THE DRAWINGS

1 CAMERA
2 SERVER DEVICE
3 USER TERMINAL DEVICE
5 SALE INFORMATION MANAGEMENT DEVICE
41 MOVING OBJECT REMOVED IMAGE GENERATOR
42 PEOPLE DETECTOR
43 HEAT MAP INFORMATION GENERATOR
51 IMAGE ACQUISITION UNIT
52 SHORTAGE STATE DETECTOR
53 DURATION ACQUISITION UNIT
54 SCREEN GENERATOR
55 DISPLAY ELEMENT SETTER
56 SHORTAGE AREA IMAGE GENERATOR
57 PRIORITY SETTER

The invention claimed is:

1. A commodity monitoring device that monitors a shortage state of commodities displayed on a sales floor based on a sales floor image in which a moving object is removed from an image obtained by imaging the sales floor, the device comprising:
   a processor; and
   a memory which stores instructions,
   wherein the commodity monitoring device includes, as a configuration when the processor executes the instructions stored in the memory,
   acquires the sales floor image sequentially;
   detects a shortage state of a target commodity displayed on the sales floor based on the sales floor image, every time the sales floor image is acquired;
   acquires a duration of the shortage state of the target commodity in a case where the shortage state of the target commodity is detected;
   generates a state display image for the target commodity;
   changes a display form of the state display image according to a length of the duration of the shortage state of the target commodity, wherein the display form graphically indicates the length of the duration of the shortage state of the target commodity; and
   generates a monitoring screen, the monitoring screen including an image area in which the state display image is superimposed on the sales floor image.

2. The commodity monitoring device of claim 1,
   wherein the processor compares the sales floor images of previous time and current time to detect a shortage area which is a screen area in which the shortage state of the target commodity occurs in the sales floor image based on a difference between the two images.

3. The commodity monitoring device of claim 2,
   wherein the processor generates a shortage area image representing the shortage area as the state display image and superimposes the shortage area image on a corresponding position on the sales floor image.

4. The commodity monitoring device of claim 3, further comprising:
   the processor sets a display element of at least one of color, transmittance, presence/absence of a frame line, and thickness of a frame line of the shortage area image to be changeable according to an operation input by a user.

5. The commodity monitoring device of claim 3,
   wherein the processor displays characters representing order of priority set according to the length of the duration in the vicinity of the shortage area image on the sales floor image.

6. The commodity monitoring device of claim 1, further comprising:
   the processor sets priority of the shortage area based on evaluation information on the sales floor and the target commodity other than the length of the duration,
   wherein the processor generates the shortage area image so as to represent the priority with a display element different from the display element representing the length of the duration.

7. The commodity monitoring device of claim 6,
   wherein the processor sets the priority of the shortage area based on, as the evaluation information, at least one of information on a status of customers looking around on the sales floor, information on sales of the target commodity, information on the stock of the target commodity, information on delivery of the target commodity, and information on priority per commodity classification.

8. The commodity monitoring device of claim 1,
   wherein, the processor causes the state display image to be displayed in a first display form when the shortage state of target commodity is first detected and changes the state display image to a second display form when the duration exceeds a predetermined reference time.

9. The commodity monitoring device of claim 1,
   wherein the processor acquires the sales floor image at predetermined unit time intervals, and
   counts the sales floor images in which the shortage state is consecutively detected by the shortage state detector and acquires the duration based on the number of the sales floor images in which the shortage state is consecutively detected.

10. A commodity monitoring system that monitors a shortage state of commodities displayed on a sales floor based on a sales floor image in which a moving object is removed from an image obtained by imaging the sales floor, the system comprising:
    a camera that images the sales floor to output the sales floor image;
    a server device that generates and outputs a monitoring screen including the sales floor image; and
    a user terminal device that displays the monitoring screen,
    wherein the server device
       acquires the sales floor image sequentially
       detects a shortage state of a target commodity displayed on the sales floor based on the sales floor image every time the sales floor image is acquired,
       acquires a duration of the shortage state of the target commodity in a case where the shortage state of the target commodity is detected,
       generates a state display image for the target commodity, changes a display form of the state display image according to a length of the duration of the shortage state of the target commodity, wherein the display form graphically indicates the length of the duration of the shortage state of the target commodity, and generates the monitoring screen, the monitoring screen including an image area in which the state display image is superimposed on the sales floor image.

11. A commodity monitoring method for causing an information processing device to perform processing of monitoring a shortage state of commodities displayed on a sales floor based on a sales floor image in which a moving object is removed from an image obtained by imaging the sales floor, the method comprising:

acquiring the sales floor image sequentially;

detecting a shortage state of a target commodity displayed on the sales floor based on the sales floor image, every time the sales floor image is acquired;

acquiring a duration of the shortage state of the target commodity in a case where the shortage state of the target commodity is detected;

generating a state display image for the target commodity;

changing a display form of the state display image according to a length of the duration of the shortage state of the target commodity, wherein the display form graphically indicates the length of the duration of the shortage state of the target commodity; and generating a monitoring screen, the monitoring screen including an image area in which the state display image is superimposed on the sales floor image.

* * * * *